UNITED STATES PATENT OFFICE.

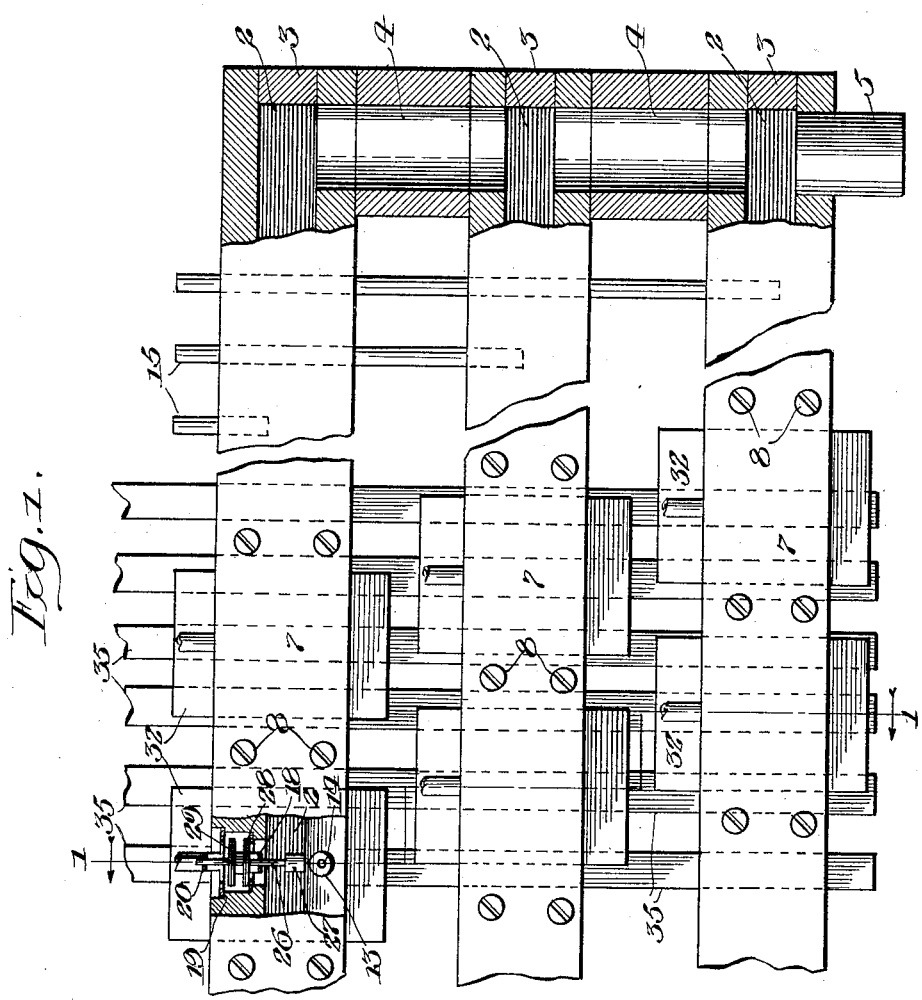

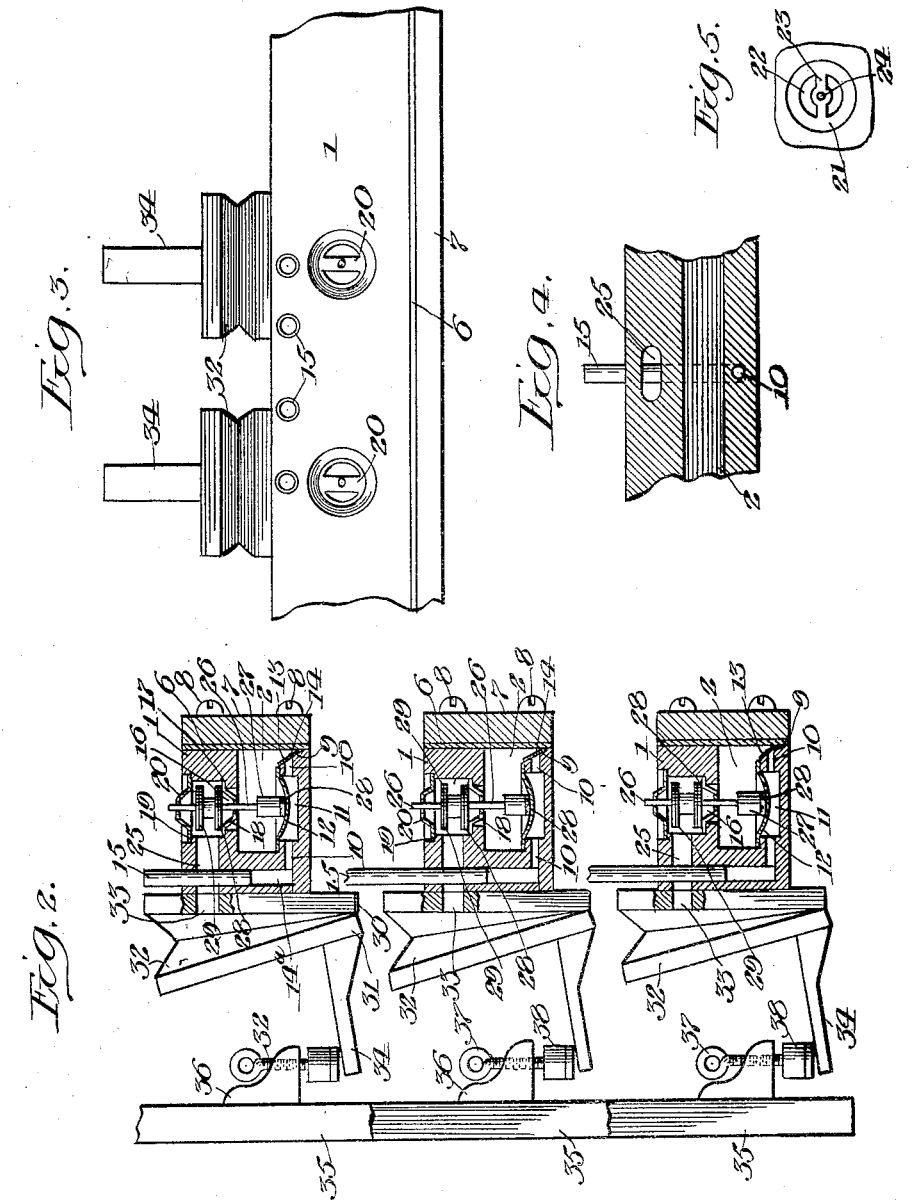

EUGENE T. TURNEY, OF DAVENPORT, IOWA, ASSIGNOR, BY MESNE ASSIGNMENTS, TO AMERICAN PLAYER ACTION COMPANY, OF NEW YORK, N. Y., A CORPORATION OF NEW YORK.

PIANO-PLAYER.

1,102,613.     Specification of Letters Patent.     Patented July 7, 1914.

Application filed October 16, 1911. Serial No. 655,076.

*To all whom it may concern:*

Be it known that I, EUGENE T. TURNEY, a citizen of the United States, residing at Davenport, in the county of Scott and State of Iowa, have invented a new and useful Improvement in Piano-Players, of which the following is a specification.

My invention has relation to improvements in piano players, and has special reference to that portion of a piano player which effects the movement of the piano action; and the objects of my invention are, first, the production of a simple mechanism for this purpose; second, the production of a mechanism which may be easily got at for adjustment or repair; and, third, to secure an increase in power and speed of such a mechanism.

I effectuate the above objects by means of the mechanism illustrated in the accompanying drawings, in which:

Figure 1 is a front elevation, partially in section, of a portion of my invention; Fig. 2 is a transverse elevation, partially in section, taken on section line 1—1 of Fig. 1; Fig. 3 is a partial plan of my invention; Fig. 4 is a vertical section on line 2—2 of Fig. 2; and Fig. 5 is a plan of a valve-stem guide and valve seat.

Similar reference numerals refer to similar parts throughout the several views.

The reference numeral, 1, designates a rectangular casing, which extends entirely across the portion of the piano which is occupied by the piano action. In the casing, 1, is a rectangular channel, 2, which extends throughout the casing, 1, and the ends of which are closed by plugs, 3. As shown in Fig. 1, I usually employ three such casings and channels, located one above the other, and the channels are connected by passage-ways, 4, and from them leads a tubing, 5, to the vacuum producing mechanism, not shown. These casings, 1, with the channels, 2, are usually known as the wind-chests, and the fronts thereof are closed by the packing, 6, and the front-board, 7, which comprise a portion of the casing, 1, and are secured thereto, by the screws, 8.

The front of the lower or bottom wall of the casing, 1, lying under the channel, 2, is beveled backwardly at 9, and a hole 10, is driven backwardly through the lower wall from the inclined portion, 9, into the wall of the casing back of the channel, 2. This hole, 10, communicates with a cavity, 11, provided in the lower wall of the casing, 1, and extending into the channel, 2. The cavity, 11, and the channel, 2, are separated from each other by the pliable diaphragm, 12, and over the front of the hole, 10, upon the inclined front face of the lower wall of the casing, 1, at 9, is provided a piece of suitable material, 13, in which is a bleed-hole, 14, establishing communication between the channel, 2, hole, 10, and cavity, 11, the bleed hole standing in a horizontal direction with one end toward the front of the chest.

A vertical channel, 14ª, is provided in the rear wall of the casing, 1, running from the top thereof into connection with the rear of the hole, 10.

A piece of tubing, 15, is driven into the channel, 14, past the top wall of the casing, 1, and sufficient of the tubing, 15, is permitted to extend from the casing, 1, in order to secure thereto a tubing to connect with the tracker-board, not shown. A hole, 16, is bored downwardly through the top wall of the casing, 1, into communication with the channel, 2. The lower portion of the hole, 16, is constructed to form the annular shoulder, 17, on which is seated a valve-stem-guide and valve seat, 18. The upper end of the hole, 16, is enlarged to provide the annular shoulder, 19, on which is seated another valve-stem guide and valve seat, 20.

As clearly shown in Fig. 5, the valve-stem guide and valve seat comprises a disk of suitable material, 21, which has punched from the center thereof an aperture or apertures, 22, and extending from the edge portion of the disk, 21, into the aperture, 22, is an arm, 23, in the center of which is provided a hole, 24, to accommodate a valve-stem. An aperture, 25, is driven into the upper wall of the casing, 1, from the back thereof, to meet the hole, 16, between the annular shoulders, 17 and 19. A valve-stem, 26, is fitted into the valve-stem guides, 18 and 20, which extends into the channel, 2, and on the lower end of which is a button, 27, the lower end of which is felt-shod at 28, and rests upon the pliable diaphragm, 13. Above the valve-seat, 18, upon the valve-stem, 26, is provided a valve, 28ª, and also upon the valve-stem, 26, is provided another valve, 29. Vertically disposed and secured to the casing, 1, back of the hole, 25, is a bellows-block, 30, to the lower end of which is pivoted a movable bellows-block, 31. The bellows-blocks, 30 and 31, are connected by means of bellows-folds, 32, and the bellows thus formed communicates with the hole, 25, through a passage, 33, in the bellows-block, 30. To the lower end of the movable bellows-block, 31, is secured at substantially right-angles an arm, 34. This extends backwardly into proximity with the sticker 35 of the piano action, upon the front of which is secured a bracket, 36. A screw, 37, passes downwardly through the bracket, 36, and carries upon the end thereof a felt-shod button, 38, which may be adjusted by means of the screw, 37, to assume the desired relation with the arm, 34.

The operation of my device is as follows: A partial vacuum is maintained, by mechanism not shown, in the channels, 2. This draws the valve, 28ª, upon the valve-seat, 18, thereby carrying the valve, 29, off the valve-seat, 20, and permitting the air to pass through the holes and channels, 16 and 25, into the bellows-folds, 32, which fall outward by gravity and permit the piano action to rest in its normal position. When a perforation in the music-roll comes into coincidence with the hole in the tracker-board which is in connection with tubing leading to the channel, 15, air enters the cavity, 11, through the channels or holes, 14ª and 10, thereby forcing the diaphragm 12 upwardly, which in its turn raises the valve-stem 26, and seats the valve, 29, upon the valve-seat 20, and opens or raises the valve, 28ª, from the valve-seat, 18. This action closes the communication between the bellows-folds, 32, and the outside atmosphere, and establishes connection between said folds, and the partially exhausted channel, 2, through the holes or channels, 32, 25 and 16. This effects the closing of the bellows, and the elevation or rotation of the arm, 34, and thus the moving of the corresponding sticker 35. When the air is again shut off from connection with the tubing, 15, the air is emptied from the cavity, 11, through the hole, 10, and bleed-hole, 14, thereby permitting the diaphragm, 12, to fall, the outside atmosphere forces the valve, 29, downwardly off its seat and opens communication between the outside air and the bellows-folds, at the same time effecting the re-seating of the valve, 28, which closes communication between the bellows-folds and the channels, 2.

As will be seen from Fig. 1, I arrange the groups of mechanism for effecting the movement of the piano action in staggered relation, thereby greatly economizing longitudinal space.

With my device it is easy to perceive that the valves may be easily taken apart and examined, without in any way disturbing any other portion of the mechanism. By removing the screws, 8, the front-board, 7, and packing, 6, may be taken away and access had to the diaphragm, 12, and bleed-hole, 14, without disturbing the rest of the mechanism. It is also well known that the length of channel greatly affects the power and rapidity of the action, and it will be readily seen that my arrangement of valves and channels is extremely compact and short. It will also be perceived that the rigid connection between the arm, 34, and the movable bellows-block, 31, secures considerable leverage, and extremely desirable, positive and direct movement of the piano action.

The arranging of the bellows in vertical positions with arms 34 mounted on the movable members of the bellows near their hinged ends permits of bringing the bellows close to the stickers. The ends of the arms 34 are free and operate merely by engaging the undersides of the projections on the stickers. This arrangement facilitates the introduction of the pneumatic mechanism in the very restricted space which is provided in some players. The arms 34 are preferably made shorter than the movable members 32 of the bellows which increases the power of the stroke and also brings the bellows close to the stickers. In the case illustrated the arms 34 are made so short that the movable members 32 of the bellows are brought as close to the stickers as is possible having regard to a proper clearance and to the introduction of the mechanism.

Having described my invention, what I claim as new, and desire to secure by Letters Patent, is:

1. A player piano including in combination vertical stickers for transmitting the movements of the keys, a vacuum chest having a vacuum chamber therein, bellows mounted in vertical positions on the back of said vacuum chest, valves for connecting said bellows with said chamber and with the atmosphere alternately, said valves being located in the top wall of said chest, diaphragms and diaphragm chambers communicating with the tracker board and located in the lower wall of said chest for operating said valves, said diaphragm chambers communicating through bleed holes with said vacuum chamber, said bleed holes being in a horizontal position with one end toward the front of the chest, said chest having a readily removable front wall to permit access to said diaphragms and bleed holes and arms projecting substantially horizontally from the hinge ends of the movable members of said bellows, said arms having free ends engaging the undersides of projections on said stickers and being shorter than the movable members of the bellows so as to bring said bellows close to the stickers and to act on said stickers with a more powerful stroke than that of said movable members.

2. A player piano including in combination vertical stickers for transmitting the movements of the keys, a vacuum chest in front of the stickers, bellows mounted in a vertical position on the back of said vacuum chest and arms projecting substantially horizontally from the hinge ends of the movable members of said bellows, said arms having free ends engaging projections on said stickers and being shorter than the movable members of the bellows so as to bring said bellows close to the stickers and to act with a more powerful stroke than that of said movable members.

3. A player piano including in combination vertical stickers for transmitting the movements of the keys, a plurality of separated wind chests at different levels, tracker tubes entering the tops of the different wind chests, a removable front wall for each of said wind chests, bellows mounted in vertical positions on the back of said wind chests and arms mounted on the movable members of said bellows and having free ends adapted to engage the undersides of projections on the stickers, so as to bring said bellows close to said stickers and to facilitate the introduction of the pneumatic mechanism in a limited space.

In testimony whereof, I have hereunto set my hand in the presence of two witnesses.

EUGENE T. TURNEY.

Witnesses:
 AUGUST SEBELIEN,
 RAYMOND J. CUPLER.

Copies of this patent may be obtained for five cents each, by addressing the "Commissioner of Patents, Washington, D. C."